United States Patent
Lee

(10) Patent No.: US 8,428,141 B2
(45) Date of Patent: Apr. 23, 2013

(54) BLOCK ERROR COMPENSATING APPARATUS OF IMAGE FRAME AND METHOD THEREOF

(75) Inventor: Sung Kyu Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 1605 days.

(21) Appl. No.: 11/682,402

(22) Filed: Mar. 6, 2007

(65) Prior Publication Data

US 2007/0147513 A1 Jun. 28, 2007

Related U.S. Application Data

(63) Continuation of application No. 10/815,669, filed on Apr. 2, 2004, now Pat. No. 7,221,710.

(30) Foreign Application Priority Data

Apr. 8, 2003 (KR) .................. 10-2003-0022018

(51) Int. Cl.
*H04N 7/12* (2006.01)
*H04N 11/02* (2006.01)

(52) U.S. Cl.
USPC ........................ 375/240.24; 375/240.27

(58) Field of Classification Search ............ 375/240
See application file for complete search history.

(56) References Cited

U.S. PATENT DOCUMENTS

| 5,212,549 | A | 5/1993 | Ng |
| 5,400,076 | A | 3/1995 | Iwamura |
| 5,410,553 | A | 4/1995 | Choon |
| 5,442,400 | A | 8/1995 | Sun |
| 5,621,467 | A | 4/1997 | Chien |
| 5,737,022 | A | 4/1998 | Yamaguchi |
| 5,841,477 | A | 11/1998 | Kim |
| 5,933,542 | A | 8/1999 | Chang |
| 6,078,616 | A | 6/2000 | Ozcelik |
| 6,134,352 | A | 10/2000 | Radha |
| 6,137,915 | A | 10/2000 | Chai |
| 7,003,174 | B2 | 2/2006 | Kryukov |
| 2001/0005399 | A1 | 6/2001 | Kimoto |
| 2004/0088378 | A1* | 5/2004 | Moats .......................... 709/219 |
| 2005/0157799 | A1* | 7/2005 | Raman et al. ............ 375/240.27 |

FOREIGN PATENT DOCUMENTS

| EP | 1081963 | 3/2001 |
| EP | 1126725 | 8/2001 |
| JP | 2001-078198 | 3/2001 |
| JP | 2001-186521 | 7/2001 |
| JP | 2002-027475 | 1/2002 |
| JP | 2003-032686 | 1/2003 |
| KR | 1998-015341 | 5/1998 |
| WO | WO03/007495 | 1/2003 |

OTHER PUBLICATIONS

Eduardo Asbun, et al., "Real-Time Error Concealment in Digital Video streams using Digital Signal Processors", XP-001200521, IEEE Transactions on Consumer Electronics, vol. 47, No. 4 (Nov. 2001). European Search Report dated Oct. 7, 2005.
Japanese Office Action dated Apr. 4, 2006.
Paul Salama, et al., "Error Concealment in MPEG Video Streams Over ATM Networks", IEEE Journal on Selected Areas in Communications, vol. 19, No. 6, (Jun. 2000).

* cited by examiner

*Primary Examiner* — Sath V Perungavoor
*Assistant Examiner* — Xiaolan Xu
(74) *Attorney, Agent, or Firm* — Fish & Richardson P.C.

(57) ABSTRACT

An apparatus and method are provided for compensating a block error in an image frame. This may include a video codec decoder for decoding an inputted image frame, and outputting a decoded image frame. An error concealment block may detect an error-generated block in the decoded image frame and compensate the detected error block through a median filter, and output the compensated image frame.

16 Claims, 3 Drawing Sheets

BLOCK ERROR COMPENSATING APPARATUS OF IMAGE FRAME AND METHOD THEREOF

FIELD

Embodiments of the present invention may relate to multimedia communication, and more particularly, to an apparatus for compensating a block error generated from an image frame and a method thereof.

BACKGROUND

Mobile communication includes communication systems primarily using a voice signal. However, as techniques for mobile communication are being developed and demands therefore are being increased, mobile communication is being developed as a multimedia communication including not only voice, but also data, as well as moving images. In multimedia communication, an amount of data to be processed may be large, and a bandwidth of an allocated channel or a data transmission speed may be limited. Techniques for transmitting/receiving a large amount of data with limited data transmission speed by compressing, for example, moving picture expert group (MPEG) techniques, have been developed.

MPEG techniques for compressing multimedia signals may reduce a data amount of the MPEG frame consecutively changed as a function of time, and transmit the multimedia signal by using an intra-coded frame (I-Frame) decoded only by information of an image frame, a predictive-coded frame (P-Frame) including only motion vector values from the I-Frame, etc. Herein, even if the I-Frame and the P-Frame have few differences by the MPEG method or other application methods, they may have a transmission ratio of about 1:15 per second.

When a block error is generated at the I-Frame, a receiving side may receive the I-Frame again, so as to compensate the block error. When a block error is generated at the P-Frame, the receiving side may perform a motion estimation process and a motion compensation process for the previous frame and the next frame of the P-Frame, so as to compensate the block error. An apparatus for compensating the block error of an image frame according to an exemplary arrangement will be explained with reference to FIG. 1.

FIG. 1 is a block diagram showing the block error compensating apparatus of an image frame according to an example arrangement.

As shown, the block error compensating apparatus of an image frame may include a video codec decoder 10 for decoding an inputted image frame, compensating an error-generated image frame among the decoded image frame, and thereby outputting. The apparatus may include a memory 12 for storing an image frame processed in the video codec decoder 10. The apparatus may include a window interface 14 for converting the image frame inputted from the video codec decoder 10 into a corresponding format for displaying and thereby outputting. The apparatus may include a display window 16 for displaying the image frame inputted from the window interface 14.

A block error compensating method of an image frame according to an example arrangement will be explained with reference to FIG. 2.

FIG. 2 is a flow chart showing the block error compensating method of an image frame according to an example arrangement.

As shown, a method for compensating a block error of an image frame may include detecting an error-generated block in a decoded image frame (S20). The method may include judging whether a frame including the detected block is a P-Frame (S22). The method may include compensating the generated block error based on the previous frame and the next frame when the frame including the detected block is the P-Frame. The method may include displaying the frame where the bock error has been compensated (S26), which may be repeated. In determining whether a frame including the detected block is a P-Frame (S22), when a frame including the detected block is an I-Frame, the I-Frame may be received again (S23) and the block error-generated image frame may be compensated by the re-received I-Frame.

A method for compensating a block error of an image frame according to an exemplary arrangement will be explained in more detail.

The video codec decoder 10 may receive an image frame from a transmitting side thus to decode, then store the decoded image frame in the memory, and then detect an error-generated block the decoded image frame (S20). Herein, the image frame may be composed of blocks having predetermined regions.

When an error-generated block is not detected in the decoded image frame, the video codec decoder 10 may output the image frame to the window interface 14. When an error-generated block is detected in the decoded image frame, the video codec decoder 10 may judge whether an image frame including the error-generated block is a P-Frame (S22).

When the image frame including the error-generated block is not the P-Frame but an I-Frame, the video codec decoder 10 may receive the I-Frame again (S23) and the block error-generated image frame may be compensated by the re-received I-Frame thereby to be outputted to the window interface 14.

On the other hand, when the image frame including the error-generated block is the P-Frame, the video codec decoder 10 may perform a motion estimation process and a motion compensation process for the previous frame and the next frame thereby to output the image frame in which the block error has been compensated to the window interface 14 (S24).

The window interface 14 may convert the inputted image frame into a corresponding format to be suitable for the display window 16, and output the converted image frame. The display window 16 may display the inputted converted image frame (S26).

As described above, in the block error compensating apparatus of an image frame, a block error-generated frame may be received again, or a motion estimation process and a motion compensation process for the previous frame and the next frame may be performed, thereby compensating the block error-generated frame.

However, in the block error compensating apparatus of an image frame, since a block error-generated frame may have to be received again, or the motion estimation process and the motion compensation process for the previous frame and the next frame may have to be performed, an additional memory for operating a large amount of data may be necessary and data may not be processed in real-time.

SUMMARY

Therefore, an embodiment(s) of the present invention may provide a block error compensating apparatus of an image frame capable of enhancing reliability by re-confirming an error generation for an error-generated block and a method thereof.

Another embodiment(s) of the present invention may provide a block error compensating apparatus of an image frame capable of compensating an error without need for additional memory by compensating a block error-generated image frame through a median filter and a method thereof.

Still another embodiment(s) of the present invention may provide a block error compensating apparatus of an image frame capable of compensating an error in real time by compensating a block error-generated image frame through a median filter and a method thereof.

To achieve these and other advantages and in accordance with the purpose of embodiments of the present invention, as embodied and broadly described herein, there is provided a block error compensating apparatus of an image frame including a video codec decoder for decoding an inputted image frame and outputting a decoded image frame. The block error compensating apparatus may include an error concealment block for detecting an error-generated block in the decoded image frame, compensating the detected error block through a median filter, and outputting a compensated image frame.

To achieve these and other advantages and in accordance with the purpose of embodiments of the present invention, as embodied and broadly described herein, there is provided a method for compensating a block error of an image frame including decoding an inputted image frame and thereby outputting a decoded image frame. The method for compensating a block error may include detecting a block error of the decoded image frame and compensating the detected block error through a median filter, and outputting a compensated image frame.

The foregoing and other objects, features, aspects and advantages of the present invention will become more apparent from the following detailed description of the present invention when read in conjunction with the accompanying drawings, all forming a part of the disclosure of the present invention.

Additional advantages, objects, and features of the invention may be set forth in part in the description which follows and in part will become apparent to those having ordinary skill in the art upon examination of the following or may be learned from practice of the invention.

BRIEF DESCRIPTION OF THE DRAWINGS

The accompanying drawings, which are included to provide a further understanding of the invention, are incorporated in and constitute a part of this specification, illustrate embodiments of the invention and together with the description serve to explain the principles of the invention.

Embodiments of the present invention will be described in detail with reference to the following drawings in which like reference numerals refer to like elements and wherein.

DETAILED DESCRIPTION

Reference will now be made in detail to exemplary embodiments of the present invention, examples of which are illustrated in the accompanying drawings.

Hereinafter, a block error compensating apparatus of an image frame that may compensate an error in real time and/or without an additional memory by compensating a block error-generated image frame through a median filter, and a method thereof will be explained with reference to the attached drawings.

Figure 1:
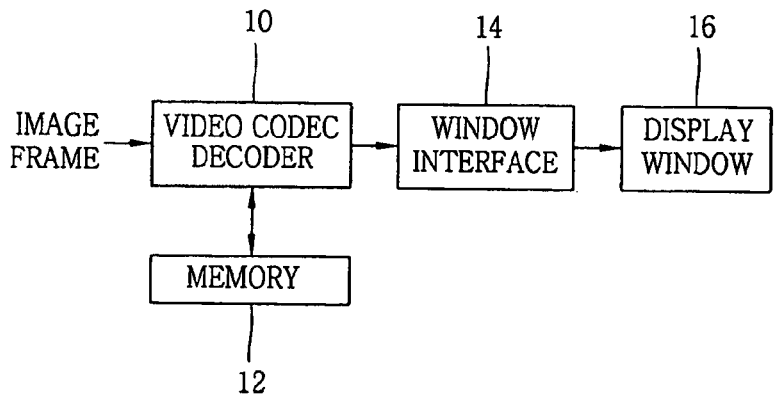
FIG. 1 is a block diagram showing a block error compensating apparatus of an image frame according to an example arrangement.
Figure 2:
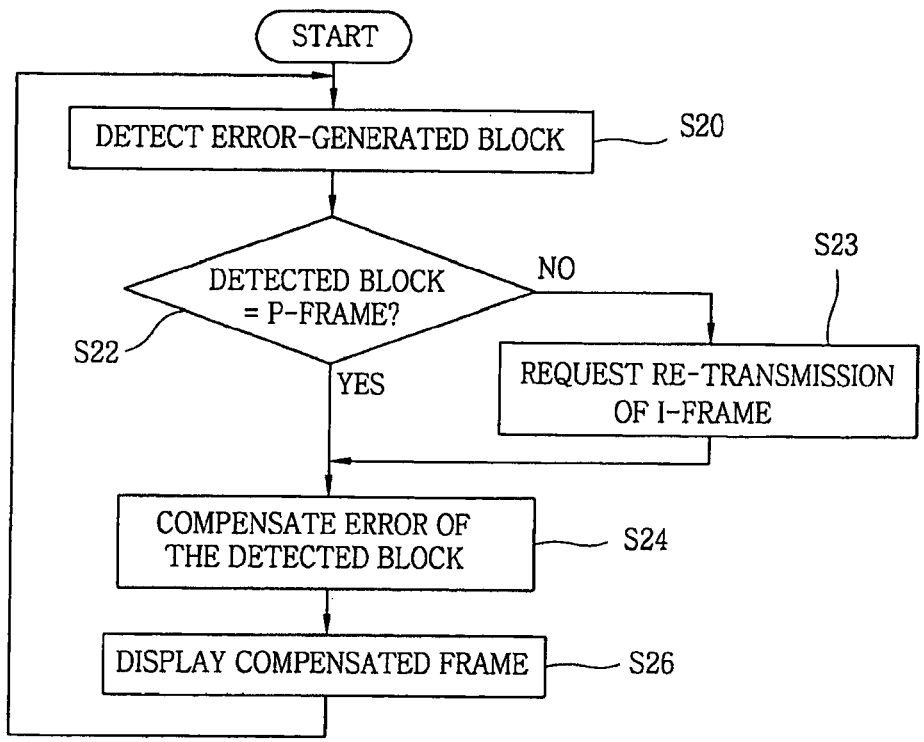
FIG. 2 is a flow chart showing a block error compensating method of an image frame according to an example arrangement.
Figure 3:
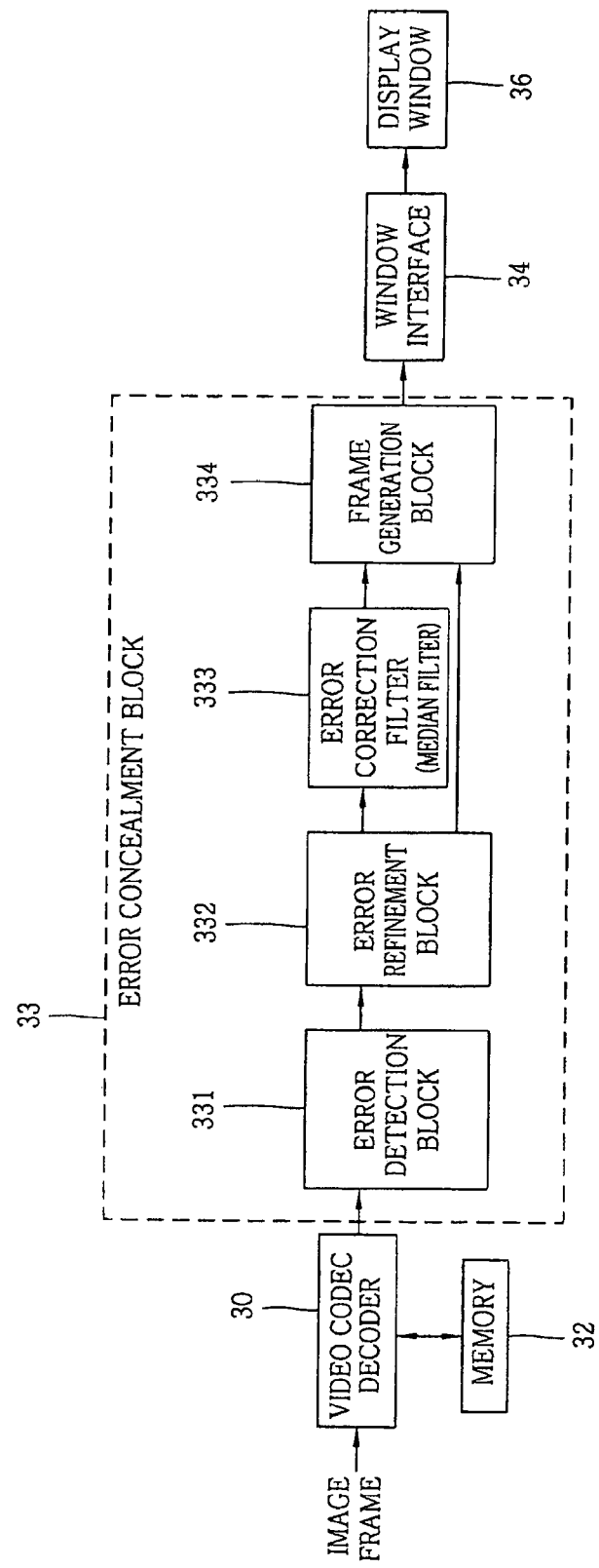
FIG. 3 is a block diagram showing a block error compensating apparatus of an image frame according to an example embodiment of the present invention.

FIG. 3 is a block diagram showing the block error compensating apparatus of an image frame according to an example embodiment of the present invention.

As shown, the block error compensating apparatus of an image frame or video according to an embodiment of the present invention may include a video codec decoder 30 for decoding an inputted image frame and outputting a decoded image frame. The apparatus may include a memory 32 for storing an image frame processed in the video codec decoder 30. The apparatus may include an error concealment block 33 for detecting a block error or video block error in the frame inputted from the video codec decoder 30, compensating the detected block error through a median filter, and outputting a compensated frame. The apparatus may include a window interface 34 for converting the frame inputted from the error concealment block 33 into a format suitable for a display device and outputting a converted frame. The apparatus may include a display window 36 for displaying the frame inputted from the window interface 34.

The error concealment block 33 may include an error detection block 331 for detecting an error-generated block in the inputted image frame. The error concealment block 33 may include an error refinement block 332 for averaging pixel values of one or more blocks adjacent preceding and/or subsequent) to the detected error block to obtain a first average value or a confirmation average value, obtaining an absolute value for a difference between the average value and a pixel value of the detected error block, and comparing the absolute value with a predetermined value. The error concealment block 33 may include an error correction filter 333 for averaging pixel values of one or more blocks adjacent to the confirmed error block through a median filter to obtain a second average value or compensation average value, and outputting the compensation average value as a pixel value of the confirmed error block when the absolute value is greater than the predetermined value. The error concealment block 33 may include a frame generation block 334 for restoring a normal or error-free image frame based on the outputted pixel value, and outputting a restored image frame.

The block error compensating method of an image frame according to an embodiment(s) of the present invention will be explained in more detail with reference to FIG. 4.

Figure 4:
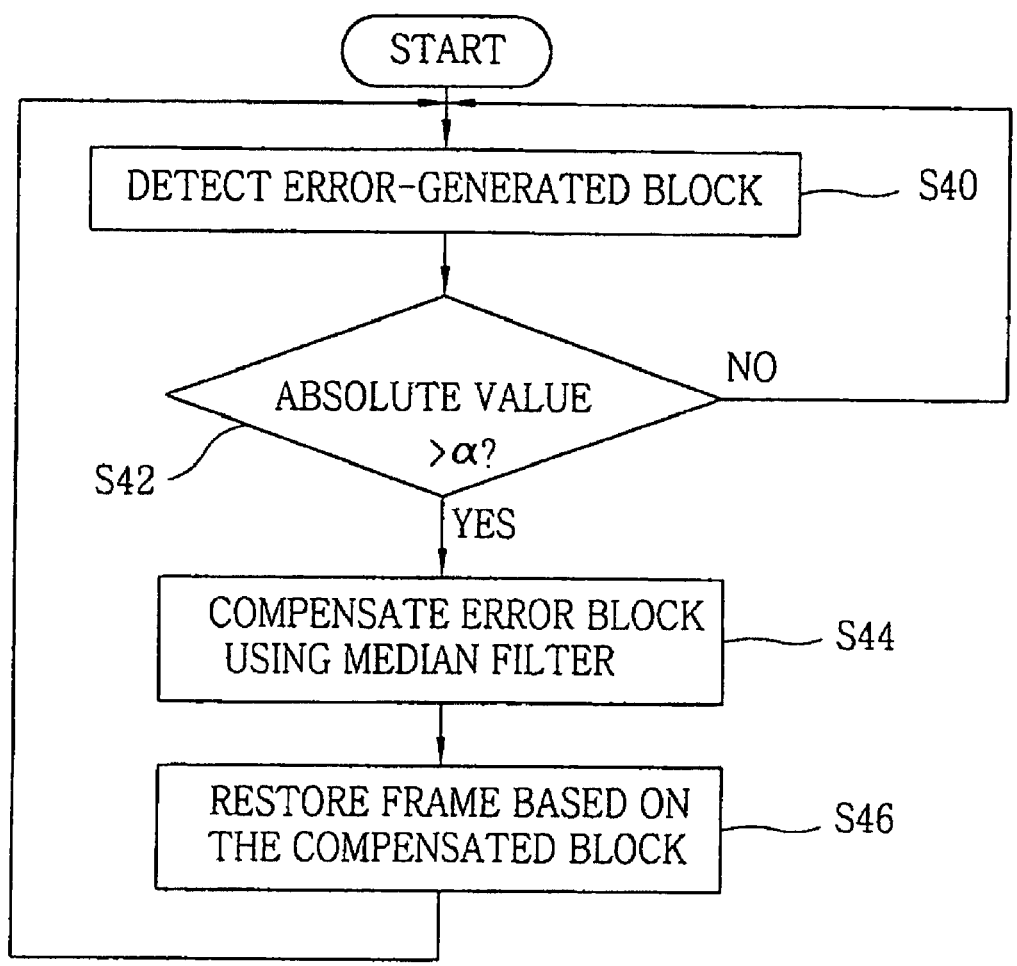
FIG. 4 is a flow chart showing a block error compensating method of an image frame according to an example embodiment of the present invention.

FIG. 4 is a flow chart showing the block error compensating method of an image frame according to an exemplary embodiment(s) of the present invention.

As shown, the block error compensating method of an image frame may include detecting an error-generated block in the decoded image frame (S40). The method may include averaging pixel values of blocks adjacent to the detected error block to obtain a first average value or confirmation average value, obtaining an absolute value for a difference between the confirmation average value and a pixel value of the detected error block, and comparing the absolute value with a predetermined value (S42). The method may include compensating the detected error block through a median filter when the absolute value is greater than the predetermined value (S44). The method may include restoring an image frame including the block based on the compensated block (S46).

The block error compensating method of an image frame according to an embodiment(s) of the present invention will be explained in more detail.

First, the video codec decoder 30 may receive an image frame from a transmitting side. The video coder decoder 30 may decode the received image frame. A decoded image frame may be stored in the memory 32. The decoded image frame may be outputted to the error detection block 331. Herein, one image frame or video frame may be composed of video blocks or pixel blocks having predetermined regions.

The error detection block 331 may detect an error-generated block in the image frame inputted from the video codec decoder 30 (S40). The detected block may be outputted to the error refinement block 332.

The error refinement block 332 may average pixel values of one or more blocks adjacent (preceding and/or subsequent) to or contiguous with the detected error block to obtain a first average value or confirmation average value. An absolute value may be obtained for a difference between the confirmation average value and a pixel value of the detected error block. The absolute value may be compared with the predetermined value. According to the comparison result (S42), it may be determined whether or not an error is generated in the detected block.

An average value for pixel values of one or more blocks adjacent to the error block may be obtained by the following formula.

$$P_S(x, y) = [P(x-1, y-1) + P(x, y-1) + P(x+1, y-1)]/ \quad \text{(Formula 1)}$$
$$3 + [P(x-1, y) + P(x+1, y)]/2 +$$
$$[P(x-1, y+1) + P(x, y+1) + P(x+1, y+1)]/3$$

In Formula 1, P(x,y) may denote a pixel value of the detected error block, and $P_s(x,y)$ may denote an average value of pixel values of one or more blocks adjacent to the detected error block. Formula 1 may be modified to include one or more successive blocks.

The error refinement block 332 may operate an average value of pixel values of one or more blocks adjacent to the detected error block. The error refinement block 332 may obtain an absolute value for a difference between P(x,y) and $P_s(x,y)$. The error refinement block 332 may compare the absolute value with the predetermined value.

$$abs[P(x,y)-P_s(x,y)] < \alpha \quad \text{(Formula 2)}$$

When the absolute value is less than or equal to the predetermined value, the error refinement block 332 may determine the detected error block to be a normal or error-free block. The error refinement block 332 may output a block having no error to the frame generation block 334. When the absolute value is greater than or equal to the predetermined value, the error refinement block 332 may determine the detected error block to be a block in which a final or confirmed error is generated, i.e., a confirmed error block or error block. The error refinement block 332 may output an error block to the error correction filter (e.g., median filter) 334.

The error correction filter 333 may average pixel values of one or more blocks adjacent (preceding or subsequent) to or contiguous with the error block through the median filter to obtain an average value or compensation average value, thereby compensating the pixel value of the error block by the compensation average value (S44). The averaging process through the median filter may be performed according to the following formula.

$$P_{gen}(x, y) = [P(x, y-1) + \quad \text{(Formula 3)}$$
$$P(x, y-3) + P(x+1, y-2) + P(x-1, y-2) +$$
$$P(x, y+1)P(x, y+3) + P(x+1, y+2)]/7$$

In Formula 3, $P_{gen}(x,y)$ may denote an average value operated through the median filter, and P(x, y) may denote a pixel value of the error block. Formula 3 may be modified to include one or more successive blocks.

Next, the frame generation block 334 may restore an image frame including the compensated block on the basis of the block compensated from the error correction filter 333, thereby outputting the restored image frame to the window interface 34 (S46).

The window interface 34 may convert the inputted image frame into a corresponding format suitable for the display window 36, and thereby output the converted image frame. The display window 36 may display the inputted image frame. A liquid crystal display (LCD), for example, may be used as the display window 36.

As aforementioned, according to the block error compensating apparatus of an image frame and the method thereof according to embodiments of the present invention, whether an error generation exists or not for the error-generated block may be re-confirmed thereby to enhance reliability.

Also, according to the block error compensating apparatus of an image frame and the method thereof according to embodiments of the present invention, the block error-generated image frame may be compensated through the median filter thereby to be able to compensate a block error without an additional memory.

In addition, according to the block error compensating apparatus of an image frame and the method thereof according to embodiments of the present invention, the block error generated image frame may be compensated through the median filter thereby to be able to compensate a block error in real time.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method comprising:
   decoding an input image signal into a decoded image signal;
   performing a comparison of at least one pixel value from a first block of the decoded image signal with at least two pixel values from a single adjacent block of the decoded image signal, wherein the comparison comprises:
   obtaining an absolute value of a result from calculations using a difference between the at least one pixel value from the first block and the at least two pixel values from the single adjacent block; and
   if said absolute value is greater than a particular value, obtaining a compensation value calculated by using the at least one pixel value from the first block and the at least two pixel values from the single adjacent block, and applying said compensation value to compensate for the first block.

2. The method of claim 1, wherein the single adjacent block precedes or succeeds the first block.

3. The method of claim 1, wherein the first block and the single adjacent block are separated by a block boundary.

4. The method of claim 1, further comprising:
   converting the decoded input image signal into a format suitable for output; and
   outputting the converted input image signal.

5. An error compensating module comprising:
   a video codec decoder configured to decode an input image signal into a decoded image signal;
   an error refinement module configured to:
      perform a comparison of at least one pixel value from a first block of the decoded image signal with at least two pixel values from a single adjacent block of the decoded image signal, wherein the error refinement module is further configured to obtain an absolute value of a result from calculations using a difference between the at least one pixel value from the first block and the at least two pixel values from the single adjacent block, and
      if said absolute value is greater than a particular value, obtain a compensation value calculated by using the at least one pixel value from the first block and the at least two pixel values from the single adjacent block; and
   an error correction filter configured to apply said compensation value to compensate for the first block.

6. The error compensating module of claim 5, further comprising:
   a window interface configured to:
      convert the decoded input image signal into a format suitable for output, and
      output the converted input image signal.

7. A method comprising:
   receiving image or video frames comprised of intra-coded frames, predictive-coded frames, or both intra-coded frames and predictive-coded frames, wherein at least one received image or video frame has at least one pixel block, said at least one pixel block being a target pixel block to be further processed;
   filtering said target pixel block by using at least one pixel value of said target pixel block and multiple pixel values of one other pixel block adjacent to said target pixel block,
   where said filtering comprises:
      obtaining an absolute value of a result from calculations using a difference between said at least one pixel value of said target pixel block and said multiple pixel values of said one other pixel block, and
      obtaining, based on a comparison of said absolute value with a particular value, a compensation value calculated by using said at least one pixel value of said target pixel block and said multiple pixel values of said one other pixel block, and applying said compensation value to compensate for said target pixel block; and
   outputting image or video frames comprised of intra-coded frames, predictive-coded frames, or both intra-coded frames and predictive-coded frames, wherein at least one output image or video frame has been compensated based on said target pixel block filtered as a result of said filtering step.

8. The method of claim 7, wherein said target pixel block and said one other pixel block are separated by a pixel block boundary.

9. The method of claim 8, wherein said filtering step is additionally performed with respect to another pixel block instead of said one other pixel block, said another pixel block being different from said one other pixel block but adjacent to said target pixel block.

10. The method of claim 9, further comprising: decoding said received image or video frames before performing said filtering step.

11. The method of claim 10, further comprising: displaying said output image or video frames on a display window via a window interface.

12. An apparatus comprising:
   a receiver configured to receive image or video frames comprised of intra-coded frames, predictive-coded frames, or both intra-coded frames and predictive-coded frames, wherein at least one received image or video frame has at least one pixel block containing an error, said at least one pixel block being a target pixel block to be further processed;
   a filter configured to filter said target pixel block by performing a comparison of at least one pixel value of said target pixel block with multiple pixel values of one other pixel block adjacent to said target pixel block,
   where said comparison comprises:
   obtaining an absolute value of a result from calculations using a difference between said at least one pixel value of said target pixel block and said multiple pixel values of said one other pixel block, and
      if said absolute value is greater than a particular value, obtaining a compensation value calculated by using said at least one pixel value of said target pixel block and said multiple pixel values of said one other pixel block, and applying said compensation value to compensate for said error in said target pixel block; and
   an outputter configured to output image or video frames comprised of intra-coded frames, predictive-coded frames, or both intra-coded frames and predictive-coded frames, wherein at least one output image or video frame has been compensated based on said target pixel block filtered as a result of said filtering step performed by said filter.

13. The apparatus of claim 12, wherein said target pixel block and said one other pixel block are separated by a pixel block boundary.

14. The apparatus of claim 13, wherein said filter is configured to additionally perform said filtering step with respect to another pixel block instead of said one other pixel block, said another pixel block being different from said one other pixel block but adjacent to said target pixel block.

15. The apparatus of claim 14, further comprising:
a decoder configured to decode said received image or video frames before performing said filtering step.

16. The apparatus of claim 15, further comprising:
a display configured to display said output image or video frames on a display window via a window interface.

* * * * *